Figure 1:
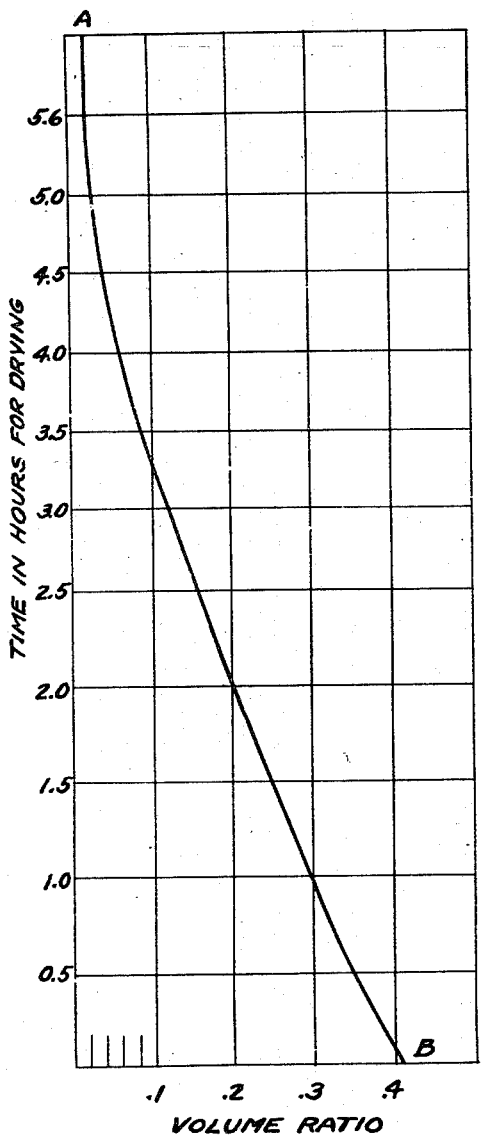

INVENTOR
T. H. MILLIKEN Jr
ATTORNEY

Nov. 8, 1949 T. H. MILLIKEN, JR 2,487,065
PREPARATION OF GEL CATALYSTS
Filed April 5, 1944 2 Sheets-Sheet 2

INVENTOR
T. H. MILLIKEN JR
BY
ATTORNEY

Patented Nov. 8, 1949

2,487,065

UNITED STATES PATENT OFFICE 2,487,065

PREPARATION OF GEL CATALYSTS

Thomas Henry Milliken, Jr., Moylan, Pa., assignor to Houdry Process Corporation, Wilmington, Del., a corporation of Delaware Application April 5, 1944, Serial No. 529,594

10 Claims. (Cl. 252—455)

The present invention relates to new and improved catalysts, processes for their preparation, and processes in which said catalysts are employed.

The precipitated oxide type of catalyst has heretofore been prepared by several rather distinct methods. To date, the most important of these methods involves the drying and grinding of hydrogel or gelatinous precipitate, following which the ground powder is mixed with water or undried hydrogel and dried either in mass or in small formed pieces. If dried in mass, the mass is crushed and graded for size. When hydrogel is mixed with the ground dried gel and the mixture formed into pieces a strong product may be obtained. However, the strength is not as great as when the initial gel structure is not broken up, since once the hydrogel structure is broken up it does not again set up as a continuous physical structure.

A recently developed method of catalyst preparation involves the preparation of hydrogel pieces, and the maintenance of the gel conformation throughout the finishing operations. In preparing catalysts of this type it is possible to follow several courses in the formation of the hydrogel, all of which are applicable in the process of the present invention. Thus, drops of sol may be suspended in a liquid in which the sol is substantially insoluble and retained suspended therein until the sol has set to a hydrogel. Likewise, the sol can be introduced into the perforations of a perforated plate and retained therein until the sol has set to hydrogel, whereupon the formed pieces are removed from the plate. A third method involves setting of a large mass of hydrogel and cutting or otherwise subdividing the mass into pieces of desired size and shape prior to finishing. Although shrinkage occurs in drying, the gel conformation of the pieces is maintained and the final catalyst pieces are of the same shape as, but of smaller size than the hydrogel pieces.

The present invention is directed to catalysts of this type in which the initial gel conformation is maintained, and to the preparation and use of such catalysts.

In the catalytic processing of hydrocarbons employing any of the contact catalysts of the above described types, it is necessary to regenerate the catalyst at intervals by burning coky deposit therefrom, in order to restore the catalyst to its initial activity. Rapid regeneration is obtained when the type of catalyst first described above is employed, i. e., the aggregate type. When employed in a static type of catalyst case, the characteristic temperature curve for the regeneration of such a catalyst shows a rapid increase in temperature initially until a maximum temperature is reached, following which the temperature drops to normal. When the above second type of catalyst is employed (i. e. wherein the initial gel conformation is retained), the regeneration is much slower. When employed in the same type of catalyst case, the regeneration temperature rises rapidly, but to a much lower level. The temperature then levels out and continues at approximately that level during the regeneration, following which the temperature drops to normal. When a regeneration kiln is operated with a continuous feed of catalyst, this difference in regeneration characteristics shows up as a lower rate of regeneration for the above second type of catalyst than for the first type of catalyst.

Objects of the present invention are to provide new and improved dried gel type catalysts in which the initial hydrogel conformation is maintained; to provide catalysts of this type which have increased rates of regeneration; to provide new and improved methods of catalyst preparation and, in particular, methods for the preparation of this type of catalyst which facilitate drying of the hydrogel; and to provide improved methods for the catalytic conversion of hydrocarbons involving the use of catalysts so prepared.

For purposes of clarity it is here pointed out that in this specification and the sub-joined claims the term "hydrogel" is used to indicate the solid colloid produced by the setting of a sol, which solid colloid is a jelly-type of material including all of the reactant solutions of the sol. The term hydrogel, as used herein, is distinguished from the gelatinous precipitate which, when formed is suspended in the liquor of the sol. Likewise, for purposes of brevity, the above second type of catalyst is referred to hereinafter as a catalyst in which the initial hydrogel conformation is maintained.

In accordance with a specific form of the present invention, an inorganic sol, which contains a fine powder of size less than fifty microns, is coagulated as a hydrogel. Pieces of the hydrogel are dried, during which the conformation of the gel pieces is maintained. The finished catalysts are of particular utility in hydrocarbon conversion reactions.

This invention is of particular application to the preparation of silicious catalysts such as silica-alumina, silica-zirconia, silica-beryllia, and ternary combinations such as silica-alumina-zirconia and silica-alumina-beryllia. Such catalysts are of importance in catalytic conversion of hydrocarbons, as for instance, for the catalytic cracking of high-boiling hydrocarbon oils to gasoline, for the reforming of naphthas including virgin, thermally cracked, and catalytically cracked naphthas to high grade gasoline, for the polymerization of hydrocarbon gases, for the refining of gasoline, and for other uses. In general, this type of catalyst contains silica and at least one material selected from the group consisting af alumina, zirconia, and beryllia or promoter materials such as magnesium, vanadium, manganese, chromium, tungsten, lithium, calcium, molybdenum, and nickel if desired. Likewise these promoters may be included with any of the combinations of silica with alumina, zirconia or beryllia, preferably, for example 1% or less.

The powder, which is of size less than fifty microns, and preferably less than 35 microns, which is incorporated in the sol, may be an active component of the catalyst or it may be an inactive material incorporated for the physical effects obtained thereby. In general the incorporated powder is one which is at least substantially insoluble in the sol and which is infusible at the temperature at which the catalyst is to be used. Materials infusible at 1000° F. are in general satisfactory. In order to obtain the improvements of the present invention the incorporated powder should, if it shrinks during drying of the gell, shrink less than the gel in which it is included. Thus, it is to be seen that fused alumina, pumice, and clay are suitable types of materials for incorporation. Also, dried and partially dried gels and gelatinous precipitates are suitable for inclusion. Alumina, pumice, and clay as well as inorganic oxide gels, examples of which are hereinafter disclosed, are materials which are readily wet by water.

The fine subdivision of the incorporated powder may be obtained in various ways. The fineness of clays in their natural state makes them eminently desirable. When clays are used it may be desirable, depending upon the clay, to separate it from coarse included material above 50 microns in size. Inert materials such as pumice may be ground to the requisite particle size. Fused alumina may be ground to size, though due to its hardness a preferred method involves grinding dried alumina to size, and passing the alumina powder, suspended in a gas, through an arc to effect the fusion of the particles. When the included powder is a dried gel various means may be employed to obtain fine particles. Thus, a dried hydrogel or gelatinous precipitate may be ground to size. Preferably, though, if a hydrogel is to be dried and ground, the physical structure of the gel is broken up before it is dried so as to minimize the power and time required for grinding. Alternatively, sufficiently large amounts of fine powder may be incorporated in a hydrogel to make it physically weak after drying, whereby grinding is facilitated. Another method of facilitating grinding involves the heating of a hydrogel or gelatinous precipitate under pressure and the expanding of the heated material into a zone of lower pressure whereby a loose, dry material is obtained which is easy to grind.

The incorporated powder may be a catalytically inactive powder. Examples of such powders are fused alumina, pumice and many of the clays, for example ball clay and Japanese clay. A preferred type of powder which may be incorporated is one which has the property known as "high-low inversion," and particularly one which exhibits this property in the temperature range at which the catalyst is to be used. This property is the result of reversible crystalline inversion from one polymorphous form to another. Examples of this type of material are quartz, which has a high-low inversion at about 570° C., and cristobalite at about 200° C. When used in a process in which alternate endothermic and exothermic reactions are occurring, as for instance in catalytic cracking of gas oil to gasoline, heat is stored at the temperature level of the inversion in addition to sensible heat.

Likewise, catalytically active powder may be used. The incorporated powder may be in and of itself a catalytically active material in the process for which the catalyst is to be employed. Thus, in hydrocarbon conversion processes the powder may be an active clay of the sub-bentonite or semi-montmorillonite type or an active gel type powder such as active silica-alumina dried gels. Alternatively, the powder may be a material which is coactive with the material of the hydrogel in the catalytic process in which the catalyst is employed. To illustrate, the powder may be a promoter for the catalytic action of the materials of the hydrogel, as with silica-alumina and silica-zirconia hydrogels, the powder may be any of the conventional promoters for these materials in cracking heavy hydrocarbons to gasoline. Again the coactive material of the powder may be a fine dried alumina or zirconia powder which is incorporated in a silica hydrogel, or either of them may be incorporated in a plural hydrogel of silica and the other. Active catalysts may be prepared by these procedures even though the powder is added in a non-hydrated state.

The fine powder is incorporated in the sol, preferably by the addition of the powder to one of the reactant solutions from which the sol is prepared following which these solutions are mixed. This procedure is generally preferred particularly with the fast-setting sols as there is generally insufficient time after the preparation of the sol to effect the addition of the powder. Alternatively, the powder may be added directly to the sol. When this procedure is employed, it is preferred to prepare a sol which will take substantial time to set; and after the addition of the powder, to add a material which will increase the rate of setting. When a material is employed to increase the rate of setting of a slow setting sol, it may either be added directly to the sol, or drops of the sol may be suspended in a liquid immiscible therewith which contains the setting agent, for example an oil containing an oil soluble acid or alkali.

As above indicated, various methods may be used for obtaining individual pieces of gel. Thus, the preferred method is to suspend drops of sol in a liquid immiscible therewith. Alternatively, the sol may be set in molds as individual pieces or in large molds in which case the mass of gel is cut up or otherwise subdivided without rupture of the hydrogel structure within the pieces. If the powder has been adequately dispersed in the sol, the powder will then permeate each piece of gel. If desired, the gel may be held for about thirty minutes or more prior to drying in order to allow syneresis to occur. In case impurities are to be removed from the catalyst by washing, as is the case with the silicious catalysts, the gel may be washed with water and, if desired, with an ammonium solt solution either before or after drying. The salt should be one having a cation which will be expelled on heating, as is the case with the ammonium salts, or having a cation which will be permanently incorporated in the catalyst and which is either inert or is useful in the catalyst as in the case of salts of promoters such as listed above.

The powder is of size less than fifty microns. It has been found that with powder of size greater than fifty microns the dried gel is so fragile that it falls to pieces upon being picked up. This result would be expected regardless of size, since the powder shrinks less than the gel in which it is incorporated and since it would be necessary to develop faults to relieve internal strains. Contrary to this expectation, however, when the particle size is less than fifty microns, it has been found that hard strong dried gels can be produced. To illustrate this point, two identical Alundum powders differing only in grain size were incorporated in a silica-alumina sol, one being greater than and the other less than fifty microns. Upon drying, the pieces containing even as much as 10% by weight of the larger powder were so weak they crushed readily in the fingers, but pieces containing as much as 40% by weight of the fine powder were firm and hard.

In the various applications of the present invention it has been observed that with powders of two different materials of differing gravities the weight percent of powder required of each to produce a particular effect is different. It has been determined, however, that like effects are produced by a pair of such powders at equal volume ratios. The volume ratio referred to is the weight percent of powder divided by the apparent density of the powder, to the weight percent of gel divided by the chunk density of the gel employed. Measurement of the apparent density of the powder has been made by placing a weighed sample of the powder in a metal cylinder of known volume per unit length, inserting a closely fitting piston on top of the powder and tamping the piston until no further contraction of the body of powder is observed, the tamping being done with a light hammer. Accurate measurement can be made when the total length of the cylinder occupied by powder is approximately one inch in a cylinder approximately one inch in diameter. When a longer cylinder is employed, say one of eight inch length, it has been observed that proper packing is obtained at the ends of the cylinder but not intermediate its length. The chunk density of the gel is obtained by drying samples of the gel without any included powder. Such chunks of gel, unless dried with extreme caution, will practically all break down to smaller pieces. This, however, does not vitiate the measurement of the chunk density. Prior to measurement the dried gel is heat treated, as for example, at 1400° F. for 10 hours, to produce normal shrinkage. A sample of the largest pieces obtained after heat treatment is weighed and the voids in the pieces of the weighed sample are saturated with water. All surface water, in so far as possible, is removed. The chunk volume is then measured in a pycnometer.

The first benefit observed upon the addition of small amounts of powder is that more severe drying conditions may be employed. Under very slow drying conditions very small amounts of powder incorporated in the sol prior to setting of the hydrogel prevent breakage during drying. It is preferred, however, that the volume ratio of the powder to gel be at least 0.1. With powder in this amount it is possible to obtain improved drying results at a drying time of 3 to 4 hours. Under air drying conditions it is preferred that the amount of powder used is sufficiently great that the value of volume ratio correlated with the time of drying lies to the right of the line AB in Fig. 1. Fig. 1 of the accompanying drawing is a graph in which volume ratio of powder is shown horizontally and the time in hours is shown vertically. To the right of the line AB is the zone in which greatly reduced breakage has been found and is the zone representing a preferred form of the present invention. To the left of the line AB improvement to a lesser degree may be obtained. Under these conditions of volume ratio of powder to gel and of time it has been found that the percent breakage during drying of pieces of gel is reduced from substantially 100% to not over about 30%.

To illustrate the effect of the addition of powder in reduction of breakage during drying, the following shows the effect on a quantitative basis. The powder employed was a coprecipitated silica alumina dried gel ground to a 5 micron particle size. This powder was incorporated in a soluble silicate solution from which a coprecipitated hydrogel was formed. Pieces of hydrogel were dried at 200° F. in circulating air. The average drying time was 7.5 minutes. Without powder added, 100% breakage of the pieces occurred. At a volume ratio of 0.33 the breakage was reduced to 94%. At a volume ratio of 0.48, breakage was reduced to 21%. At a volume ratio of 0.65 breakage was reduced to 4%. To illustrate the effect of longer drying time, the temperature was reduced to 120° F. and the rate of air flow was reduced, whereby an average drying time of 90 minutes was obtained. At a volume ratio of 0.25 the breakage was but 28%. By increasing the powder to a volume ratio of 0.48 the breakage was reduced to 3%, as compared with the above noted 21% breakage at the 7½ minute average drying time.

Figure 2:
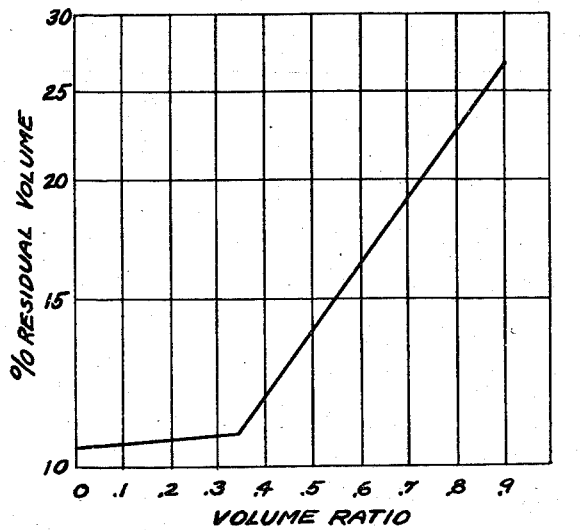
Figure 3:
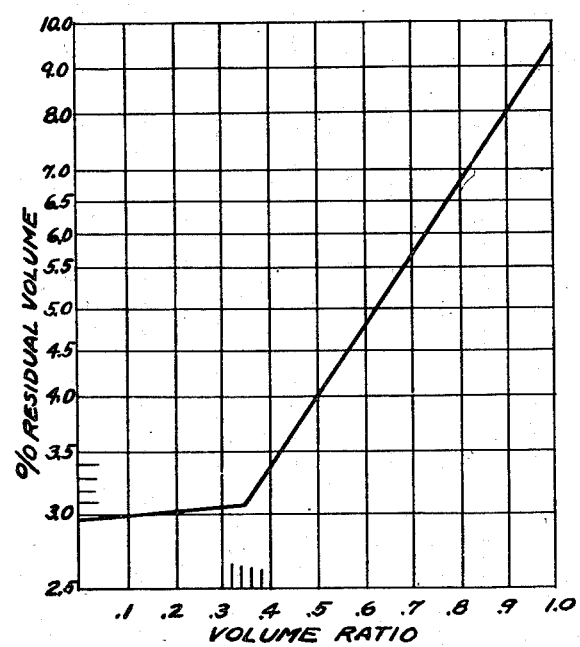

As above indicated, the powder added to the sol either does not shrink or has a lower shrinkage upon drying than the gel formed from the sol. Accordingly, with increasing increments of the volume ratio of powder to gel the shrinkage upon drying is less. This shrinkage is best expressed by the term "percent residual volume," which is the heat treated volume of a chunk of gel times 100 divided by the volume of the gel prior to drying. Thus, for example, if a piece of hydrogel is dried and heat treated and after heat treatment is one-fourth the volume that it was prior to drying, the percent residual volume is 25%. Accordingly, as the volume ratio increases from 0, the percent residual volume slowly increases. This slow and steady increase continues until the volume ratio of 0.35 is reached, where, as shown in accompanying Figs. 2 and 3, the percent residual volume increases at a drastically greater rate. Figs. 2 and 3 are graphs in which the volume ratio is shown horizontally in units of equal size and the percent residual volume is shown vertically on a log scale for convenience.

Fig. 2 involves a system in which the powder added was a coprecipitated silica alumina gel ground to 5 micron particle size having an apparent density, as measured by the method above described, of 0.66 and the gel a particle or chunk density of 1.3. In this system 15% of powder is necessary to produce a volume ratio of 0.35. The system shown in Fig. 3 involves Alundum grain of 12 micron particle size having an apparent density of 2 and a gel having a particle or chunk density of 1.72. In this system 29% of Alundum was necessary to produce a volume ratio of .35. These two graphs illustrate the point that the volume ratio as defined is controlling of the results accomplished by the addition of the powder since the break in these two dissimilar systems occurs at the same volume ratio. For the purpose of producing mechanically strong pieces of gel in form for use a volume ratio of 1 should not be exceeded. It will be noted from Figure 1, that the line AB intercepts the co-ordinate .35 (volume ratio) at about 0.5 (hours drying time).

The fundamental reason for the change in the direction of the curves shown in Figs. 2 and 3 is not known. It is believed that in the volume ratio range from 0.35 to 1, the powder functions to open the structure of the gel in its dried state without substantial deterioration of the strength of the piece of gel in case the size of the powder is less than 50 microns. However, this does not explain the break in the graphed data.

Example 1

A powder was prepared by forming a coprecipitated hydrogel of silica and alumina from "N-Brand" sodium silicate and solution of sodium aluminate in relative proportions to give a silica-alumina weight ratio of 7:1. The precipitation is effected in the presence of ammonium sulfate in amount sufficient that one mol of ammonium ion is present per mol of sodium ion derived from the silicate and aluminate. The coprecipitated hydrogel was dried, ground, washed with water, treated with ammonium nitrate substantially to remove sodium and washed with water to remove nitrate. The gel was dried and ground to approximately 5 micron particle size, which in this example is hereinafter referred to as "the powder." This powder had an apparent density measured by the described method of 0.66.

The powder was suspended in a solution of "N-Brand" sodium silicate. A sodium aluminate solution was added in amount to give 90 weight percent silica, 10 weight percent alumina. To the solution so formed ammonium sulfate was added as a coagulant in amount sufficient that 0.25 to 0.27 mols of ammonium ion were added per mol of sodium present. The powder was added in varying amounts, as will be hereinafter described. One sample was prepared without the addition of powder for comparative purposes and is hereafter designated as the "control." The pellet or chunk density of the control was measured as above described and found to be 1.3. The sol containing suspended powder was run immediately after the addition of ammonium sulfate into a mold plate containing apertures therethrough 4 mm. in diameter, the plate being 4 mm. thick. One end of the mold openings is closed by placing the plates on an impervious surface. After allowing the plates to stand for 15 minutes to harden the gel, the pellets were blown out of the plates into a 10% solution of ammonium sulfate. The ammonium sulfate acted to remove sodium from the molded pellets, the solution being changed every four hours. The pellets were then washed with water to remove sulfate. Samples of the control pellets were dried in drying times averaging 7½ minutes and 1½ hours. Under both drying conditions 100% of the control pellets broke during drying. Pellets containing 14.4% by weight (dry basis) of powder, which on a volume ratio basis was equal to 0.33, were dried under the same conditions as the control. At 7.5 minutes drying time 94% of the pellets broke, whereas at one and one-half hours drying time 9% breakage occurred. The pellets were prepared containing 27% by weight (dry basis) of the powder which was, on volume ratio basis, 0.75. Under the quick drying conditions 8% of the pellets broke whereas under the slower drying conditions at 1½ hours average time, only 1% breakage occurred. The percent residual volume after heat treatment at 1400° F. for 10 hours in a mixture of 5% steam and 95% air, for the control and for the two samples containing 14.4% and 27% were respectively 10.5%, 11.9% and 22.1%. Thus it is to be seen that the incorporation of 27 of the powder resulted in an increase of volume as compared with the control of over 100%. The catalyst containing 27% powder was employed for the cracking of light East Texas gas oil of boiling range 440 to 760 at a temperature of 800° F., at atmospheric pressure with no steam added and at a rate of 1.5 volumes of oil (liquid basis) per volume of catalyst per hour. There was produced 48% gasoline by volume based on charge together with 2.9% coke and 8.3% gas, each by weight. This represents a substantial improvement in gasoline to coke and gasoline to gas ratios over either the control or the powder used alone as catalysts. This catalyst is likewise useful in other hydrocarbon conversion processes in which gasoline boiling range materials are contained in the effluent materials and coke is deposited in the catalyst, for instance, treatment of gasoline to decrease the acid heat and increase the octane rating and the polymerization of butenes to gasoline.

Example 2

The powder employed in this example was Alundum having an average particle size of 12 microns and a measured apparent density of 2. The gel in which the "Alundum" was incorporated contained 89% silica and 11% alumina prepared by mixing a solution of "N-Brand" sodium silicate with a solution of aluminum sulfate, the concentrations being such that the sol contained a total of 50 grams per liter of silica and alumina. Acetic acid was added in quantities sufficient to give a pH of 4.2. Chunks of the gel containing no Alundum were washed by dialysis to remove the sodium, and were then dried and heat treated at 1400° F. for 10 hours in a mixture of 5% steam and 95% air. During drying and heat treatment the gel shrunk to 2.5% of its volume in the hydrogel state and had a measured pellet or chunk density of 1.72.

A catalyst was prepared by incorporating 20% of Alundum (based on "Alundum" + silica + alumina) in the N-Brand silicate used in the preparation of the gel. This amount of Alundum was sufficient to give a volume ratio of 0.215. The chunks of the hydrogel were finished for catalyst as described in connection with the gel free of Alundum. The finished catalyst had a pellet or chunk density of 1.75 kg. per liter and a percent residual volume of 3.1.

Another catalyst was prepared in which 40% Alundum was incorporated, sufficient to give a volume ratio of 0.573. This catalyst was finished by the same method above described and had a pellet or chunk density of 1.71 kg. per liter. The percent residual volume of this catalyst was 5.3, showing accordingly an improvement of over 100% in the volume of catalyst obtained in the drying of any given number of equal size pellets or beads of a particular size. This benefit is obtained regardless of the composition of the fine powder employed. Both the catalyst containing 20% Alundum and that containing 40% Alundum were hard and showed improved heat content per unit of apparent volume of catalyst over the catalyst not containing Alundum powder.

*Example 3*

A solution was prepared by introducing 31.6 kgs. of N-Brand silicate and 0.5 kg. of bentonite clay into 13.6 kgs. of water. A second solution of sodium aluminate was prepared containing 1.86 kgs. per 38.1 kgs. of water. A third solution was prepared which contained 1.89 kgs. of ammonium sulfate per 25.6 kgs. of water. The first two solutions were continuously mixed at rates proportional to their volumes and after thorough mixing of these two, the third solution acting to increase the rate of coagulation, was continuously added at a rate proportional to its volume. The mixture of the three solutions, which was a sol containing suspended clay, was run into mold plates, as described in Example 1. The plates were allowed to age for one hour and, with the gel still in place, were treated with ammonium sulfate solution. The hydrogel was then discharged from the plates by blowing with air. The hydrogel pellets were then treated four times with 10% solutions of ammonium sulfate, following which the hydrogel was washed substantially free of sulfate. The hydrogel pellets were then dried at an average time of about one and one-half hours. The dried pellets were heat treated at 1400° F. for 10 hours in a mixture of 5% steam, 95% air. This catalyst was employed for cracking under the conditions stated in Example 1, resulting in the production of 52% gasoline by volume, 11.5 weight percent gas, and 3.8 weight percent coke, based on charge.

I claim as my invention:

1. The process of preparing gel type of catalyst which comprises incorporating powder of a size less than 35 microns into a sol, which powder is infusible at 1000° F. and relatively insoluble in the sol, said sol being characterized by its setting as hydrogel, allowing said sol to set as hydrogel including said powder dispersed throughout said gel, drying discrete pieces of said hydrogel over a period of not less than 0.5 hours, said powder being present in amount sufficient that correlated with the time of drying the volume ratio lies to the right of the line AB in Fig. 1 of the accompanying drawing, and maintaining the original conformation of said hydrogel in said pieces throughout the drying operation.

2. The process of preparing gel type of catalyst which comprises, incorporating in an aqueous sol a powder of size less than fifty microns which powder is infusible at 1000° F. and wet by although relatively insoluble in the sol, said sol being characterized by its setting as a hydrogel, allowing said sol to set as hydrogel which includes said powder intimately throughout, drying discrete pieces of said hydrogel containing said powder over a period of not less than 0.5 hour, and maintaining the original conformation of said hydrogel in said pieces throughout the drying operation, said powder being present in amount sufficient that the volume ratio of powder to gel is between 0.35 and 1, thereby reducing breakage of said pieces during drying at the drying rate employed.

3. The process of preparing gel type of catalyst, which comprises incorporating in an aqueous sol a powder of size less than fifty microns which powder is infusible at 1000° F. and wet by although relatively insoluble in the sol, said sol being characterized by its setting as a hydrogel, allowing said sol to set as hydrogel which includes said powder intimately throughout, drying discrete pieces of said hydrogel containing powder at a comparatively rapid rate sufficient that pieces of hydrogel similarly formed but not containing powder would substantially all break, said powder being present in at least sufficient quantity as determined by the line AB of Figure 1 substantially to eliminate the breakage of said pieces during drying at the drying rate employed, whereby the original conformation of said hydrogel in said pieces is maintained throughout said drying operation.

4. The process of preparing gel type of catalyst which comprises, incorporating in a sol powder of a size less than fifty microns, which powder is infusible at 1000° F. and insoluble in the sol in the concentration present, said sol being characterized by its setting as hydrogel, suspending drops of said sol in a liquid in which the sol is substantially insoluble for a time sufficient to allow setting of said sol, drying the drops of hydrogel thus set at a comparatively rapid rate to effect drying in not more than 90 minutes, and maintaining the original conformation of the hydrogel in the drop form throughout the drying operation, said powder being present in amount sufficient that the volume ratio of powder to gel is between 0.35 and 1 thereby reducing breakage of said pieces during drying at the drying rate employed.

5. The process of preparing gel type of catalyst which comprises, incorporating in a sol a powder of a size less than 50 microns, which powder is infusible at temperatures at which the catalyst is to be employed, is wet by water, and is relatively insoluble in the sol, allowing said sol to set as hydrogel, drying discrete pieces of said hydrogel and maintaining the original conformation of said hydrogel pieces throughout said drying operation, said powder being present in amount sufficient that the volume ratio of powder to gel is between 0.35 and 1, thereby permitting rapid drying of the hydrogel pieces without substantial breakage.

6. The process of preparing catalysts containing silica-alumina gel, which comprises forming a mixed sol from aqueous solutions of silicon and aluminum compounds, said sol being characterized by its setting as a hydrogel, suspending in said sol fused alumina powder of twelve micron average size in an amount furnishing approximately 40% by weight of total solids in the subsequently formed dried gel, allowing said sol to set as hydrogel, and drying discrete pieces of said hydrogel to dried gel state while maintaining within said pieces the original hydrogel conformation.

7. The process of preparing catalysts comprising siliceous plural oxide gel which comprises forming a mixed sol from reactants, said sol being characterized by setting to the desired hydrogel, suspending in said sol a powder of size less than 50 microns composed of a dried siliceous plural oxide gel substantially identical in composition which said siliceous plural oxide gel, said powder being included in an amount sufficient that the volume ratio of the powder to the gel is between 0.35 and 1, allowing said sol to set as hydrogel including said powder dispersed therein, and drying discrete pieces of said hydrogel while maintaining within said pieces the original hydrogel conformation.

8. The process in accordance with claim 7 wherein said powder is of approximately 5 micron average particle size.

9. The process of preparing catalysts comprising siliceous plural oxide gel which comprises forming a mixed sol from reactants, said sol being characterized by setting to the desired hydrogel, suspending in said sol a powder infusible at 1000° F. and of a size less than 50 microns, said powder being wet by but substantially insoluble in said sol, and said powder being included in amounts sufficient that the volume ratio of the powder to the gel is between 0.35 and 1, allowing said sol to set as hydrogel including said powder dispersed therein, and drying discrete pieces of said hydrogel while maintaining within said pieces the original hydrogel conformation.

10. The process of preparing catalysts comprising siliceous plural oxide gel which comprises forming a mixed sol from reactants, said sol being characterized by setting to the desired hydrogel, suspending in said sol clay of a particle size less than 50 microns in amounts sufficient that the volume ratio of the clay to gel is between 0.35 and 1, allowing said sol to set as hydrogel including said clay dispersed therein, and drying discrete pieces of said hydrogel while maintaining within said pieces the original hydrogel conformation.

THOMAS HENRY MILLIKEN, JR.

REFERENCES CITED

The following references are of record in the file of this patent:

UNITED STATES PATENTS

| Number | Name | Date |
| --- | --- | --- |
| Re. 21,690 | Bond | Jan. 14, 1941 |
| 1,672,768 | Miller et al. | June 5, 1928 |
| 1,868,565 | Connolly | July 26, 1932 |
| 2,161,677 | Houdry | June 6, 1939 |
| 2,326,523 | Connolly et al. | Aug. 10, 1943 |
| 2,384,943 | Marisic | Sept. 18, 1945 |
| 2,384,944 | Marisic | Sept. 18, 1945 |
| 2,396,758 | Stratford | Mar. 16, 1946 |